(12) United States Patent
Nurmi et al.

(10) Patent No.: US 11,545,854 B2
(45) Date of Patent: Jan. 3, 2023

(54) APPARATUSES, METHODS AND COMPUTER PROGRAMS FOR WIRELESS ENERGY TRANSFER CONTROL

(71) Applicant: Nokia Technologies Oy, Espoo (FI)

(72) Inventors: Juha Nurmi, Salo (FI); Matti Naskali, Tokyo (JP); Heikki Paananen, Nagano-Ken (JP)

(73) Assignee: Nokia Technologies Oy, Espoo (FI)

( * ) Notice: Subject to any disclaimer, the term of this patent is extended or adjusted under 35 U.S.C. 154(b) by 160 days.

(21) Appl. No.: 15/763,657

(22) PCT Filed: Oct. 7, 2016

(86) PCT No.: PCT/FI2016/050703
§ 371 (c)(1),
(2) Date: Mar. 27, 2018

(87) PCT Pub. No.: WO2017/064366
PCT Pub. Date: Apr. 20, 2017

(65) Prior Publication Data
US 2018/0287423 A1    Oct. 4, 2018

(30) Foreign Application Priority Data
Oct. 13, 2015    (EP) .................................. 15189648

(51) Int. Cl.
| | | |
|---|---|---|
| H02J 50/10 | (2016.01) |
| H02J 7/02 | (2016.01) |
| H02J 50/80 | (2016.01) |
| H02J 5/00 | (2016.01) |
| H02J 50/50 | (2016.01) |
| H02J 50/12 | (2016.01) |
| H02J 50/40 | (2016.01) |

(52) U.S. Cl.
CPC .............. *H02J 50/10* (2016.02); *H02J 5/005* (2013.01); *H02J 7/025* (2013.01); *H02J 50/12* (2016.02); *H02J 50/40* (2016.02); *H02J 50/50* (2016.02); *H02J 50/80* (2016.02)

(58) Field of Classification Search
None
See application file for complete search history.

(56) References Cited

U.S. PATENT DOCUMENTS

| | | | |
|---|---|---|---|
| 2005/0134213 A1 | 6/2005 | Takagi et al. .................. 320/108 |
| 2010/0181964 A1 | 7/2010 | Huggins et al. ............... 320/108 |
| 2011/0018360 A1* | 1/2011 | Baarman .................. H02J 50/40 |
| | | | 307/104 |
| 2015/0229134 A1 | 8/2015 | Masaoka et al. |
| 2016/0064994 A1* | 3/2016 | Ku ........................ H04B 5/0037 |
| | | | 307/104 |

(Continued)

FOREIGN PATENT DOCUMENTS

| | | |
|---|---|---|
| EP | 2 615 720 A2 | 7/2013 |
| WO | WO-2012/037279 A1 | 3/2012 |
| WO | WO 2013/165165 A1 | 11/2013 |

*Primary Examiner* — Daniel Kessie
(74) *Attorney, Agent, or Firm* — Harrington & Smith

(57) ABSTRACT

A method including controlling a wireless energy transfer apparatus to synchronize energy transfer with at least one further wireless energy transfer apparatus to wirelessly transfer energy to at least one load in combination with the at least one further wireless energy transfer apparatus.

16 Claims, 8 Drawing Sheets

(56) References Cited

U.S. PATENT DOCUMENTS

Figure 1:
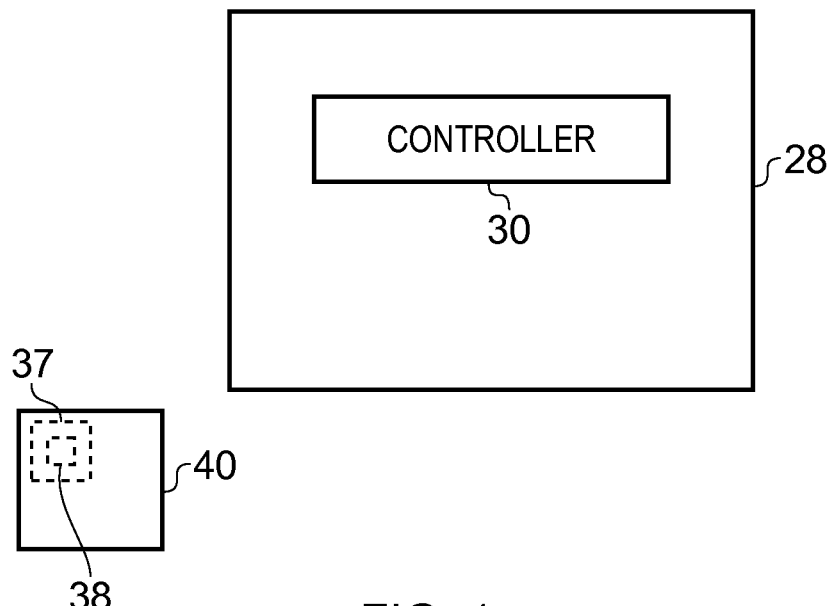

| | | | |
|---|---|---|---|
| 2016/0099576 A1* | 4/2016 | Ho | H02J 7/025 |
| | | | 320/108 |
| 2016/0163451 A1* | 6/2016 | Wang | H01F 41/042 |
| | | | 336/192 |
| 2018/0241251 A1* | 8/2018 | Nomura | B60L 53/12 |

* cited by examiner

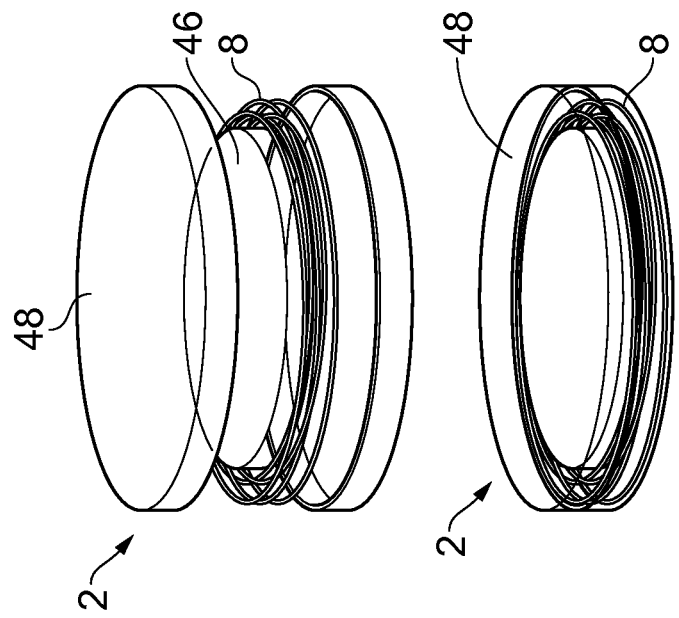
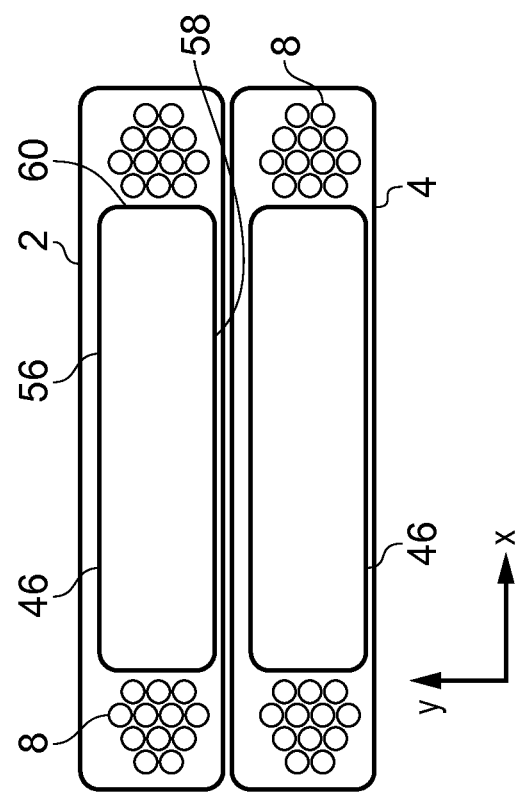
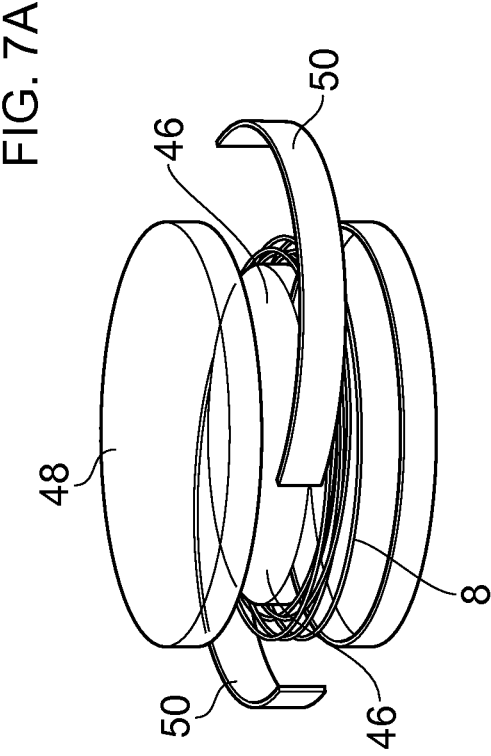
FIG. 7A
FIG. 7B

APPARATUSES, METHODS AND COMPUTER PROGRAMS FOR WIRELESS ENERGY TRANSFER CONTROL

TECHNOLOGICAL FIELD

Examples of the disclosure relate to apparatuses, methods and computer programs for wireless energy transfer control. In particular they relate to apparatuses, methods and computer programs for wireless energy transfer control in inductive wireless energy transfer.

BACKGROUND

Wireless energy transfer apparatuses, such as wireless batteries, are capable of transferring and/or receiving energy wirelessly. For example, energy may be transferred from/to a wireless battery inductively using a magnetic field generated by, for example, a wireless battery to provide energy to a device requiring power.

Wireless energy transfer apparatuses, such as wireless batteries, are designed with certain energy storage and transfer characteristics and may therefore provide energy to a wireless receiver according to the designed energy characteristics of the wireless battery.

BRIEF SUMMARY

According to various, but not necessarily all, examples of the disclosure there is provided a method comprising:

controlling a wireless energy transfer apparatus to synchronize energy transfer with at least one further wireless energy transfer apparatus to wirelessly transfer energy to at least one load in combination with the at least one further wireless energy transfer apparatus.

The wireless energy transfer apparatus and the at least one further wireless energy transfer apparatus may be inductive energy transfer apparatuses.

Controlling a wireless energy transfer apparatus to synchronize energy transfer with at least one further wireless energy transfer apparatus may comprise controlling a frequency and/or phase of an electrical current passing through at least one magnetic field generator to generate at least one magnetic field having substantially the same frequency and phase as a magnetic field generated by the at least one further wireless energy transfer apparatus.

The method may comprise:

determining the amount and/or direction of current flow in a conductor of the wireless energy transfer apparatus; and controlling adjustment of a frequency and/or phase of wireless energy transfer at the wireless energy transfer apparatus in dependence upon the determination of the amount and/or direction of current flow in the conductor.

The method may comprise receiving at least one current signal comprising information to allow determination of an electrical current flowing through the conductor of the wireless energy transfer apparatus, wherein determining the amount and/or direction of current flow in the conductor comprises using the received information in the at least one current signal.

Controlling adjustment of the frequency and/or phase of wireless energy transfer at the wireless energy transfer apparatus may comprise controlling adjustment of the frequency and/or phase of wireless energy transfer to increase wireless energy out-flow from the wireless energy transfer apparatus.

Determining the amount and/or direction of current flow in the conductor and controlling adjustment of the frequency and/or phase of wireless energy transfer at the wireless energy transfer apparatus may be repeated according to a schedule.

The method may comprise receiving at least one schedule signal comprising information to allow determination of the schedule to be used.

The at least one schedule signal may originate from at least one further wireless energy transfer apparatus or from an apparatus separate from the wireless energy transfer apparatuses.

The method may comprise receiving at least one synchronization signal from at least one further apparatus, the at least one synchronization signal comprising information to allow energy transfer from the wireless energy transfer apparatus to be synchronized with wireless energy transfer from the at least one further wireless energy transfer apparatus.

The method may comprise causing transmission of at least one synchronization signal to at least one further apparatus, the at least one synchronization signal comprising information to allow energy transfer from the wireless energy transfer apparatus to be synchronized with wireless energy transfer from the at least one further wireless energy transfer apparatus.

The at least one further apparatus may be the at least one further wireless energy transfer apparatus.

The at least one synchronization signal may comprise a message, the message comprising timing information of wireless energy transfer and/or phase correction information.

The method may comprise receiving inductive feedback from the at least one further wireless energy transfer apparatus to cause synchronization of wireless energy transfer from the wireless energy transfer apparatus and the at least one further wireless energy transfer apparatus to the at least one load.

The received inductive feedback may steer the frequency and/or phase of wireless energy transfer from the wireless energy transfer apparatus.

The method may comprise:

controlling the wireless energy transfer apparatus to stop wireless transfer of energy;

receiving one or more wireless energy transfer signals from the at least one further wireless energy transfer apparatus;

determining frequency and/or phase information of the wireless energy transfer signals from the at least one further wireless energy transfer apparatus; and controlling the wireless energy transfer apparatus to wirelessly transfer energy in synchronization with the at least one further wireless energy transfer apparatus based on the determined frequency and/or phase information.

Controlling the wireless energy transfer apparatus to wirelessly transfer energy in synchronization with the at least one further wireless energy transfer apparatus may comprise causing impulse steering of a resonator of the wireless energy transfer apparatus.

The wireless energy transfer signals may comprise magnetic flux from the at least one further wireless energy transfer apparatus.

The wireless energy transfer apparatus may be configured to wirelessly transfer energy to the at least one load in any orientation.

According to various, but not necessarily all, examples of the disclosure there is provided an apparatus comprising means for performing the method as described in the preceding paragraphs.

According to various, but not necessarily all, examples of the disclosure there is provided an apparatus comprising:
at least one processor; and
at least one memory including computer program code;
the at least one memory and the computer program code configured to, with the at least one processor, cause the apparatus at least to perform the method as described in the preceding paragraphs.

According to various, but not necessarily all, examples of the disclosure there is provided an apparatus comprising:
a controller configured to control a wireless energy transfer apparatus to synchronize energy transfer with at least one further wireless energy transfer apparatus to wirelessly transfer energy to at least one load in combination with the at least one further wireless energy transfer apparatus.

The wireless energy transfer apparatus and the at least one further wireless energy transfer apparatus may be inductive energy transfer apparatuses.

Controlling a wireless energy transfer apparatus to synchronize energy transfer with at least one further wireless energy transfer apparatus may comprise controlling a frequency and/or phase of an electrical current passing through at least one magnetic field generator to generate at least one magnetic field having substantially the same frequency and phase as a magnetic field generated by the at least one further wireless energy transfer apparatus.

The controller may be configured to:
determine the amount and/or direction of current flow in a conductor of the wireless energy transfer apparatus; and
control adjustment of a frequency and/or phase of wireless energy transfer at the wireless energy transfer apparatus in dependence upon the determination of the amount and/or direction of current flow in the conductor.

The controller may be configured to receive at least one current signal comprising information to allow determination of an electrical current flowing through the conductor of the wireless energy transfer apparatus, wherein determining the amount and/or direction of current flow in the conductor comprises using the received information in the at least one current signal.

Controlling adjustment of the frequency and/or phase of wireless energy transfer at the wireless energy transfer apparatus may comprise controlling adjustment of the frequency and/or phase of wireless energy transfer to increase wireless energy out-flow from the wireless energy transfer apparatus.

Determining the amount and/or direction of current flow in the conductor and controlling adjustment of the frequency and/or phase of wireless energy transfer at the wireless energy transfer apparatus may be repeated according to a schedule.

The controller may be configured to receive at least one schedule signal comprising information to allow determination of the schedule to be used.

The at least one schedule signal may originate from at least one further wireless energy transfer apparatus or from an apparatus separate from the wireless energy transfer apparatuses.

The controller may be configured to receive at least one synchronization signal from at least one further apparatus, the at least one synchronization signal comprising information to allow energy transfer from the wireless energy transfer apparatus to be synchronized with wireless energy transfer from the at least one further wireless energy transfer apparatus.

The controller may be configured to cause transmission of at least one synchronization signal to at least one further apparatus, the at least one synchronization signal comprising information to allow energy transfer from the wireless energy transfer apparatus to be synchronized with wireless energy transfer from the at least one further wireless energy transfer apparatus.

The at least one further apparatus may be the at least one further wireless energy transfer apparatus.

The at least one synchronization signal may comprise a message, the message comprising timing information of wireless energy transfer and/or phase correction information.

The controller may be configured to receive inductive feedback from the at least one further wireless energy transfer apparatus to cause synchronization of wireless energy transfer from the wireless energy transfer apparatus and the at least one further wireless energy transfer apparatus to the at least one load.

The received inductive feedback may steer the frequency and/or phase of wireless energy transfer from the wireless energy transfer apparatus.

The controller may be configured to:
control the wireless energy transfer apparatus to stop wireless transfer of energy; receive one or more wireless energy transfer signals from the at least one further wireless energy transfer apparatus;
determine frequency and/or phase information of the wireless energy transfer signals from the at least one further wireless energy transfer apparatus; and
control the wireless energy transfer apparatus to wirelessly transfer energy in synchronization with the at least one further wireless energy transfer apparatus based on the determined frequency and/or phase information.

Controlling the wireless energy transfer apparatus to wirelessly transfer energy in synchronization with the at least one further wireless energy transfer apparatus may comprise causing impulse steering of a resonator of the wireless energy transfer apparatus.

The wireless energy transfer signals may comprise magnetic flux from the at least one further wireless energy transfer apparatus.

The wireless energy transfer apparatus is configured to wirelessly transfer energy to the at least one load in any orientation.

The wireless energy transfer apparatus may comprise at least one coil configured to provide and/or receive at least one magnetic field to provide for wireless energy transfer with the wireless energy transfer apparatus in any orientation.

According to various, but not necessarily all, examples of the disclosure there is provided a computer program that, when executed by at least one processor, causes an apparatus to perform at least the method as described in the preceding paragraphs.

According to various, but not necessarily all, examples of the disclosure there is provided a method comprising:
using a plurality of wireless energy transfer apparatuses to wirelessly transfer energy to a single load.

The plurality of wireless energy transfer apparatuses may be inductive wireless energy transfer apparatuses.

Each of the plurality of wireless energy transfer apparatuses may form part of a magnetic energy transmission path to the single load. The magnetic energy transmission path may be a common magnetic energy transmission path.

The plurality of wireless energy transfer apparatuses may be stacked.

According to various, but not necessarily all, examples of the disclosure there is provided examples as claimed in the appended claims.

BRIEF DESCRIPTION

Figure 2:
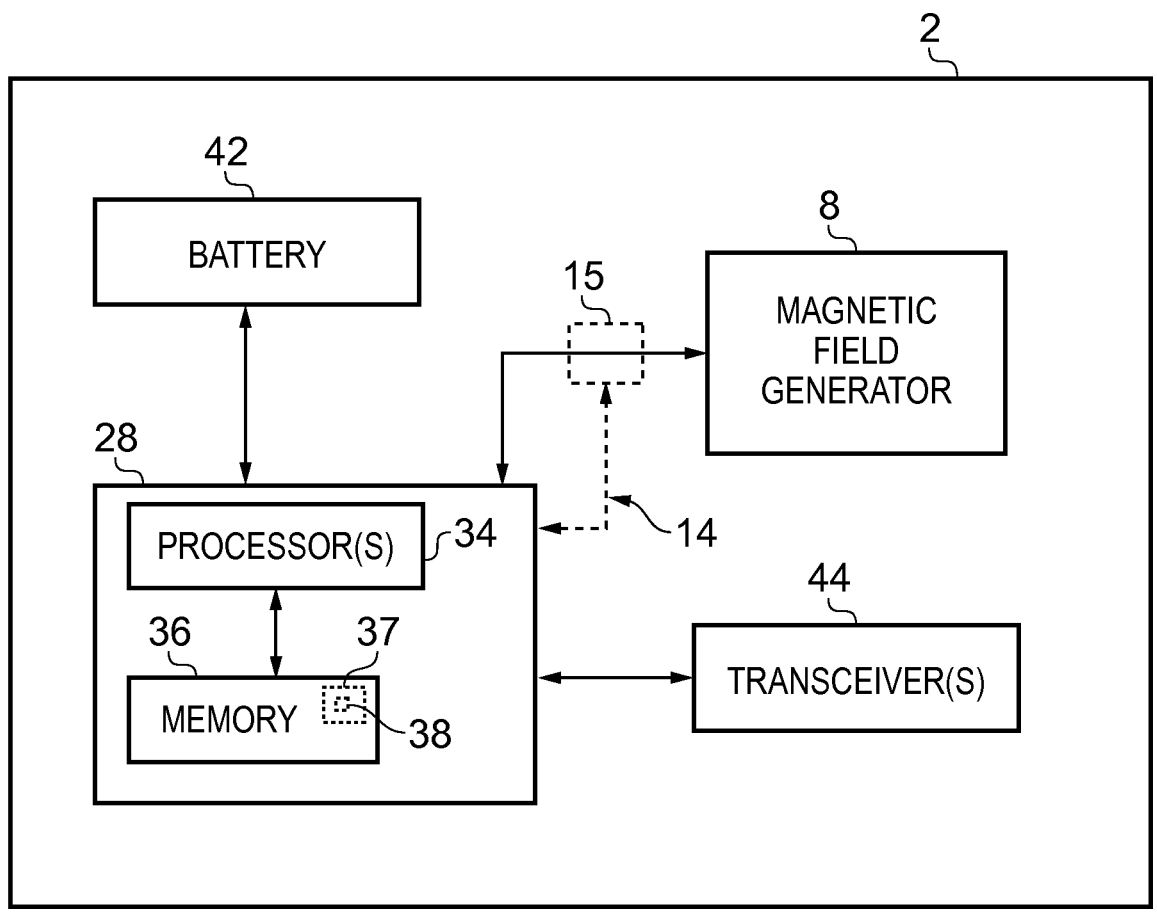
Figure 3:
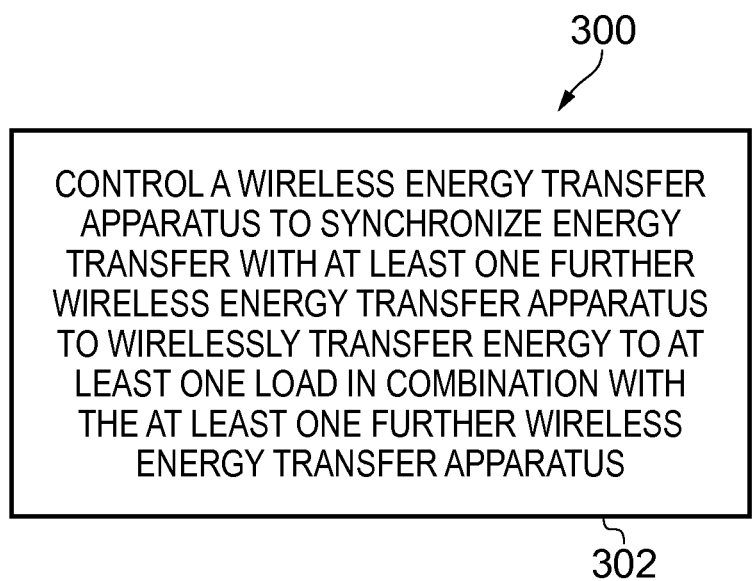
Figure 4A:
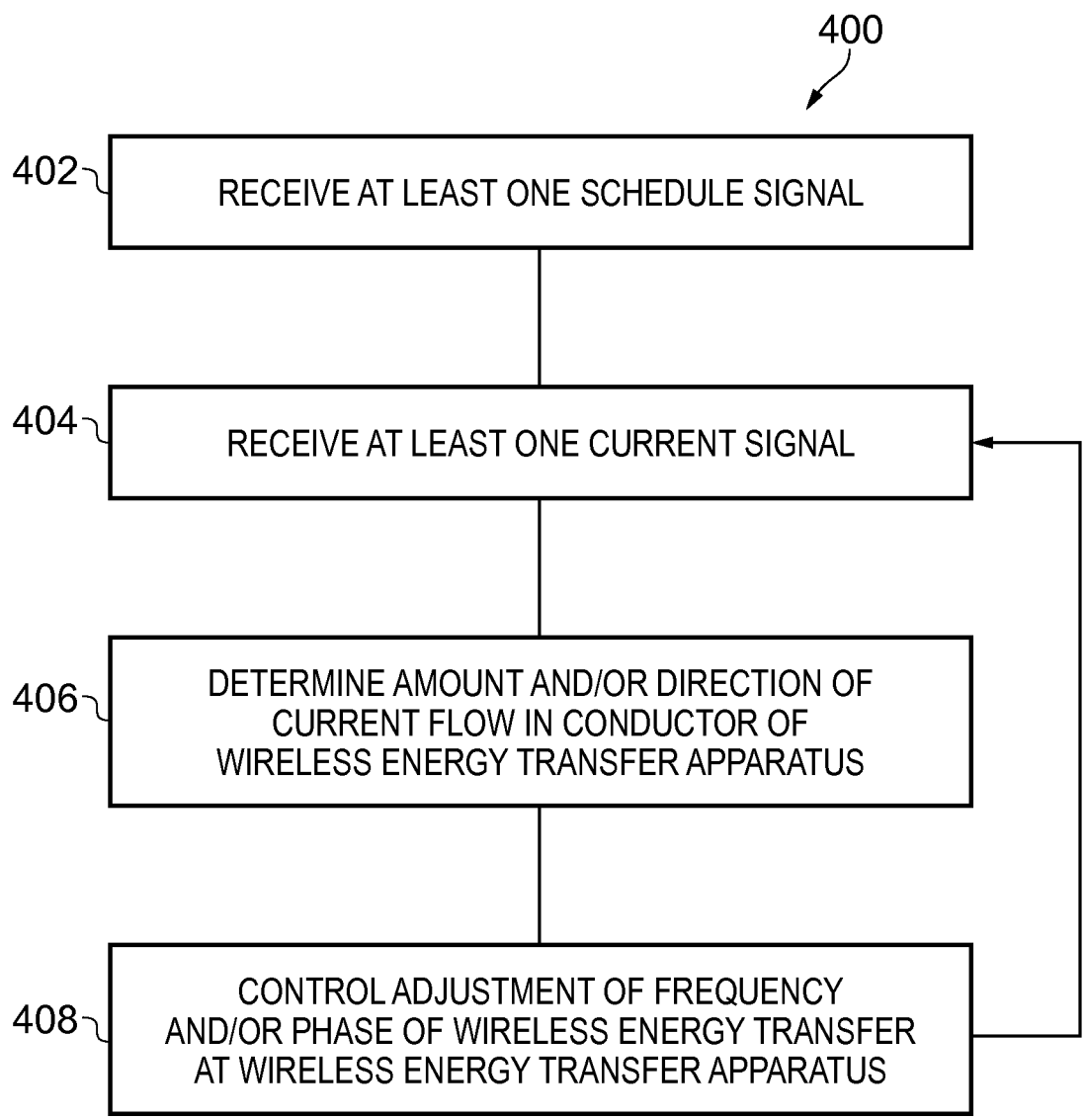
Figure 4B:
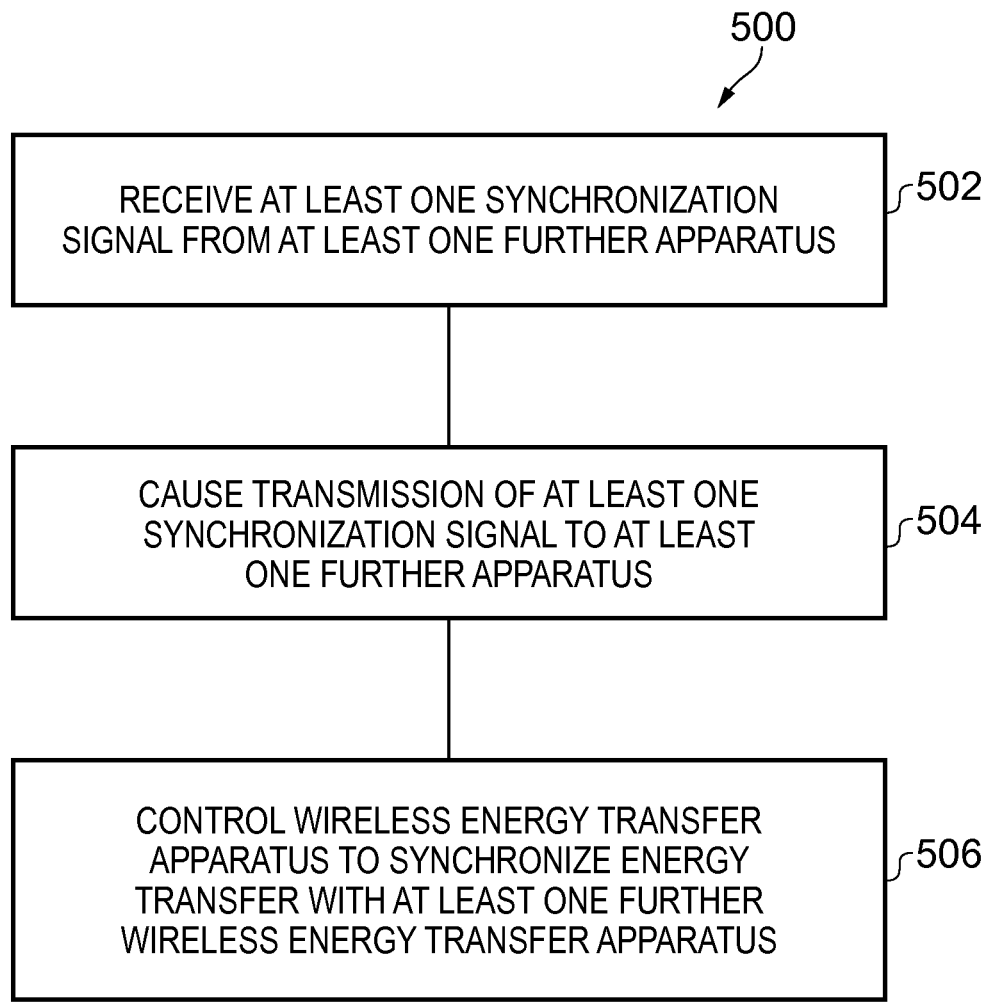
Figure 4C:
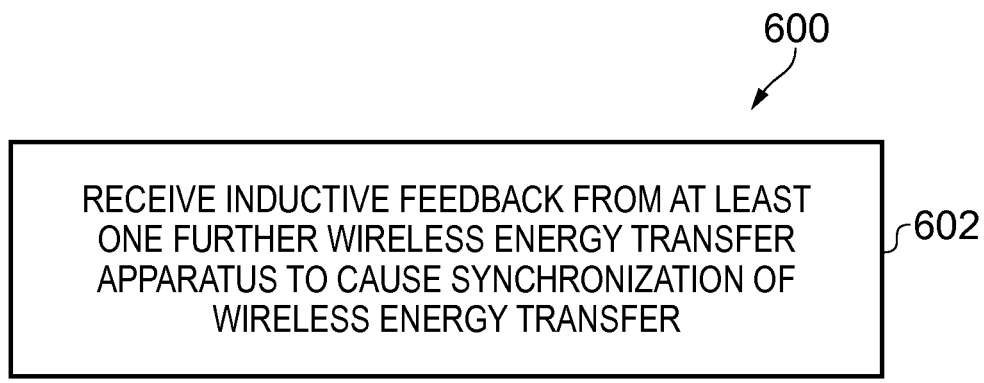
Figure 4D:
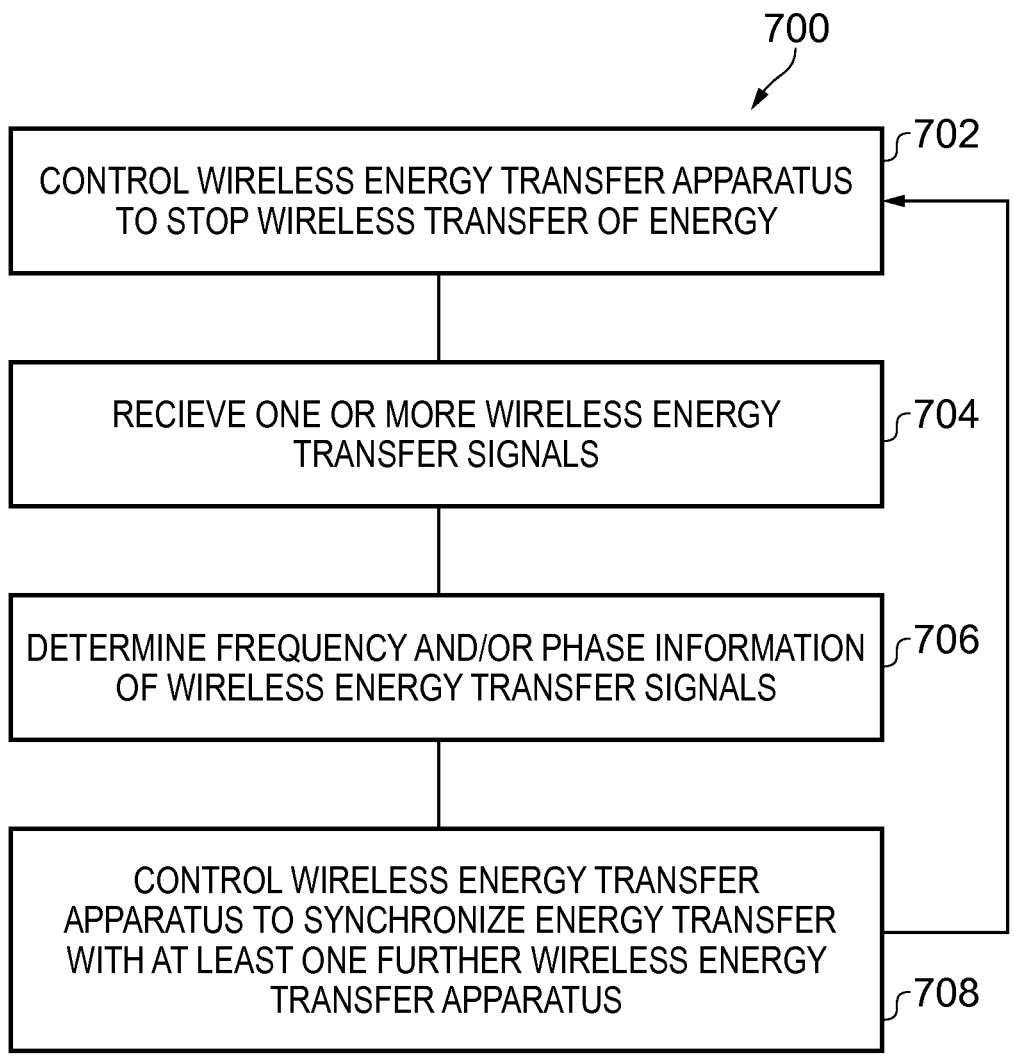
Figure 5:
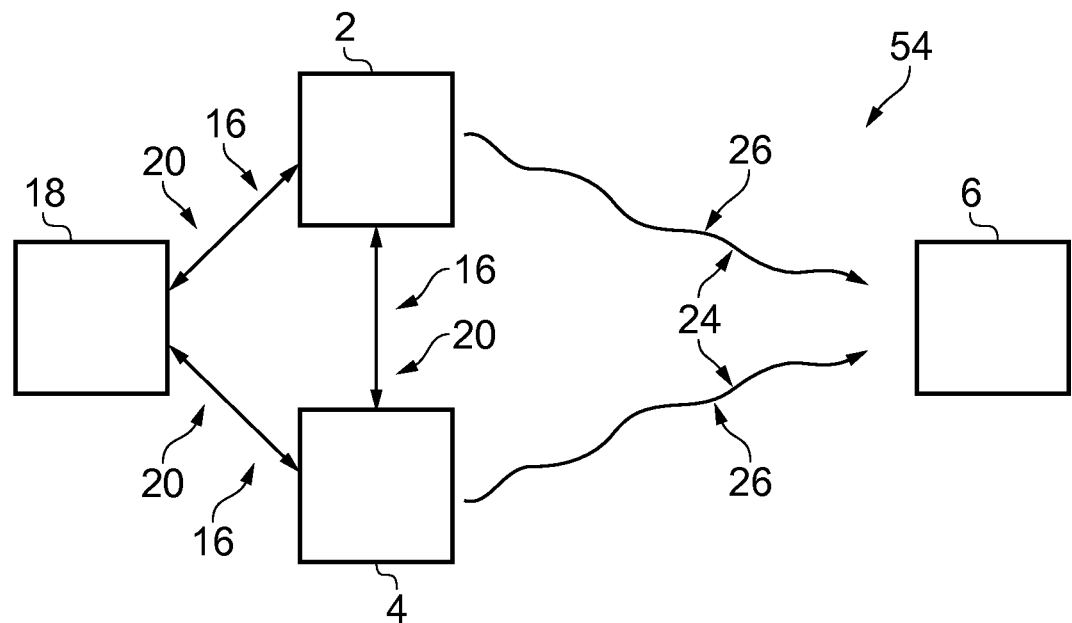
Figure 6:
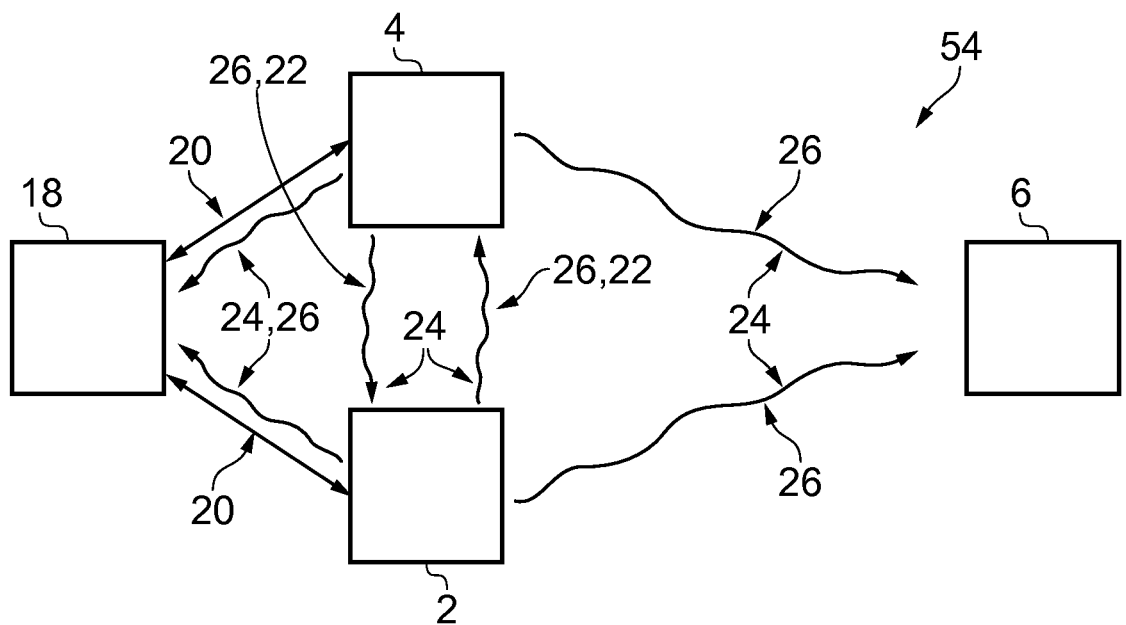
Figure 8:
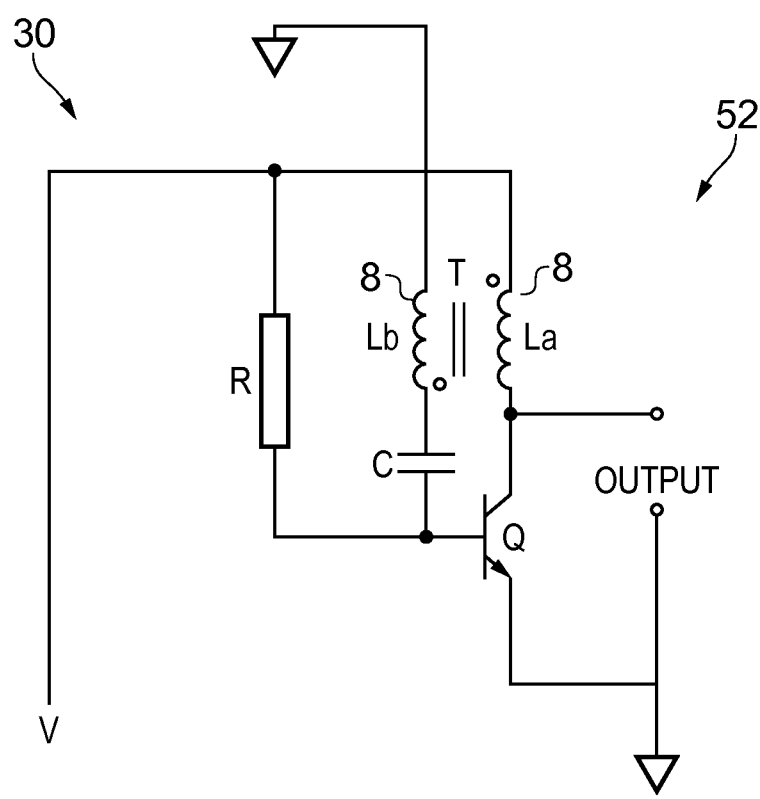

For a better understanding of various examples that are useful for understanding the detailed description, reference will now be made by way of example only to the accompanying drawings in which:

FIG. 1 illustrates an example of an apparatus;
FIG. 2 illustrates an example of an apparatus;
FIG. 3 illustrates an example of a method;
FIG. 4A illustrates an example of a method;
FIG. 4B illustrates an example of a method;
FIG. 4C illustrates an example of a method;
FIG. 4D illustrates an example of a method;
FIG. 5 illustrates an example of a system;
FIG. 6 illustrates an example of a system;
FIGS. 7A and 7B illustrate examples of wireless energy transfer apparatuses; and
FIG. 8 illustrates an example of a controller.

DETAILED DESCRIPTION

Examples of the disclosure relate to controlling a wireless energy transfer apparatus to synchronize energy transfer with at least one further wireless energy transfer apparatus.

In conventional systems, alkaline batteries may be connected in series or parallel to, for example, increase the power provided by the connected alkaline batteries.

In examples, a wireless energy transfer apparatus, such as an inductive wireless energy transfer apparatus, is controlled to synchronize energy transfer with at least one further wireless energy transfer apparatus to wirelessly transfer energy to at least one load in combination with the at least one further wireless energy transfer apparatus. In examples, a plurality of wireless energy transfer apparatuses, such as wireless batteries, may provide energy to a single load at the same time.

In examples, synchronizing energy transfer comprises synchronizing frequency and/or phase of a magnetic field generated by a wireless energy transfer apparatus to have substantially the same frequency and/or phase as a magnetic field generated by one or more further wireless energy transfer apparatuses.

A technical effect of at least some examples of the disclosure is, for example, allowing the wireless energy transfer apparatuses to provide energy to a load in combination, similar to when alkaline batteries are connected in series or parallel, and may therefore provide greater power to the load and/or increase battery life of the wireless energy transfer apparatuses.

Examples of the disclosure also relate to a wireless energy transfer apparatus, such as a wireless battery, that can be used in any orientation to receive/transmit energy with one or more further wireless energy transfer apparatuses. For example, the wireless energy transfer apparatus may be configured to wirelessly transfer energy to at least one load in any orientation.

A technical effect of at least some examples of the disclosure is, for example, allowing the wireless energy transfer apparatus to be stacked and, for example, create a shared ferromagnetic core for inductive energy transfer.

Another technical effect of at least some examples of the disclosure is, for example, providing for ease of use of the wireless energy transfer apparatus as the wireless energy transfer apparatus can be used in any orientation and still provide/receive energy.

FIGS. 1, 2, 5, 6, 7A, 7B and 8 illustrate an apparatus 28 comprising a controller 30 configured to control a wireless energy transfer apparatus 2 to synchronize energy transfer with at least one further wireless energy transfer apparatus 4 to wirelessly transfer energy to at least one load 6 in combination with the at least one further wireless energy transfer apparatus 4.

FIGS. 1, 2, 5, 6, 7A, 7B and 8 illustrate an apparatus 28 comprising means for controlling a wireless energy transfer apparatus 2 to synchronize energy transfer with at least one further wireless energy transfer apparatus 4 to wirelessly transfer energy to at least one load 6 in combination with the at least one further wireless energy transfer apparatus 4.

FIG. 3 illustrates a method 300 comprising controlling a wireless energy transfer apparatus 2 to synchronize energy transfer with at least one wireless energy transfer apparatus 4 to wirelessly transfer energy to at least one load 6 in combination with the at least one further wireless energy transfer apparatus 4.

FIG. 1 illustrates an example of an apparatus 28.

The apparatus 28 comprises a controller 30. In examples, the apparatus 28 may be a chip or a chipset and may be comprised in a wireless energy transfer apparatus 2 (see, for example, FIG. 2).

Implementation of a controller 30 may be as controller circuitry. The controller 30 may be implemented in hardware alone, have certain aspects in software including firmware alone or can be a combination of hardware and software (including firmware).

As illustrated in FIGS. 1 and 2 the controller 30 may be implemented using instructions that enable hardware functionality, for example, by using executable instructions of a computer program 37 in a general-purpose or special-purpose processor 34 that may be stored on a computer readable storage medium (disk, memory and so on) to be executed by such a processor 34.

The processor 34 is configured to read from and write to the memory 36. The processor 34 may also comprise an output interface via which data and/or commands are output by the processor 34 and an input interface via which data and/or commands are input to the processor 34.

The memory 36 stores a computer program 37 comprising computer program instructions (computer program code 38) that controls the operation of the apparatus 28 when loaded into the processor 34. The computer program instructions, of the computer program 37, provide the logic and routines that enables the apparatus to perform the methods illustrated in FIGS. 3, 4A, 4B, 4C and 4D. The processor 34 by reading the memory 36 is able to load and execute the computer program 37.

The apparatus 28 therefore comprises:

at least one processor 34; and at least one memory 36 including computer program code 38 the at least one memory 36 and the computer program code 38 configured to, with the at least one processor 34, cause the apparatus 28 at least to perform:

controlling a wireless energy transfer apparatus to synchronize energy transfer with at least one further wireless energy transfer apparatus to wirelessly transfer energy to at least one load in combination with the at least one further wireless energy transfer apparatus.

As illustrated in FIG. 1, the computer program 37 may arrive at the apparatus 28 via any suitable delivery mechanism 40. The delivery mechanism 40 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 37. The delivery mechanism may be a signal configured to reliably transfer the computer program 37. The apparatus 28 may propagate or transmit the computer program 37 as a computer data signal.

Although the memory 36 is illustrated as a single component/circuitry it may be implemented as one or more separate components/circuitry some or all of which may be integrated/removable and/or may provide permanent/semi-permanent/dynamic/cached storage.

Although the processor 34 is illustrated as a single component/circuitry it may be implemented as one or more separate components/circuitry some or all of which may be integrated/removable. The processor 34 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable):

(i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In examples the controller comprises means, for example control circuitry, for providing an oscillation to provide an alternating electric current through a magnetic field generator, such as an inductor, to generate a magnetic field having a frequency and phase controlled using the oscillation.

In some examples the controller 30 may comprise an electronic oscillator comprising a timer, such as a crystal, for example a quartz crystal and driver circuitry such as an H-bridge. In some examples the controller 30 may comprise oscillator circuitry, such as one or more blocking oscillators 52 (see FIG. 8), that are configured to provide the oscillation.

In examples the controller 30 may comprise circuitry configured to receive inductive feedback, for example one or more blocking oscillators 52 (see FIG. 8).

The blocks illustrated in the FIGS. 3, 4A, 4B, 4C and 4D may represent steps in a method and/or sections of code in the computer program 37. The illustration of a particular order to the blocks does not necessarily imply that there is a required or preferred order for the blocks and the order and arrangement of the block may be varied. Furthermore, it may be possible for some blocks to be omitted.

In examples, the apparatus 28 provides means for performing the methods illustrated in FIGS. 3 and 4A to 4D.

In the example of FIG. 1, the apparatus 28 is an apparatus 28 comprising a controller 30 configured to control a wireless energy transfer apparatus 2 (see, for example, FIG. 2) to synchronize energy transfer with at least one further wireless energy transfer apparatus 4 (see, for example, FIG. 5) to wirelessly transfer energy to at least one load 6 in combination with the at least one further wireless energy transfer apparatus 4.

In examples the at least one load 6 may be a single load 6, for example a single apparatus requiring power.

In examples, the wireless energy transfer apparatus 2 and at least one further wireless energy transfer apparatus 4 are inductive energy transfer apparatuses.

In examples, controlling a wireless energy transfer apparatus 2 to synchronize energy transfer with at least one further wireless energy transfer apparatus 4 comprises controlling a frequency and/or phase of an electrical current passing through at least one magnetic field generator 8 (see, for example, FIG. 2) to generate at least one magnetic field having substantially the same frequency and phase as a magnetic field generated by the at least one further wireless energy transfer apparatus 4.

FIG. 2 illustrates an example of an apparatus, which in the illustrated example is a wireless energy transfer apparatus 2. In FIG. 2, the wireless energy transfer apparatus 2 is an inductive energy transfer apparatus.

In the example of FIG. 2, the wireless energy transfer apparatus 2 comprises one or more batteries 42, one or more magnetic field generators 8, one or more transceivers 44, and the apparatus 28 of FIG. 1.

In FIG. 2, the controller 30 of the apparatus 28 comprises one or more processors 34 and a memory 36. The one or more processors 34 and the memory 36 may be as described above in relation to FIG. 1.

The one or more processors 34 provide means for controlling operation of the wireless energy transfer apparatus 2.

As illustrated in the example of FIG. 2, the elements 42, 8, 44 are operationally coupled to the apparatus 28 and any number or combination of intervening elements can exist between them (including no intervening elements).

In other examples, the elements 42, 8, 44 may be operationally coupled to each other and/or may share one or more components.

In some examples, the wireless energy transfer apparatus 2 may comprise at least one current sensor 15, which is illustrated in the example of FIG. 2 as a dashed rectangle linked to the apparatus 28 by a double-ended, dashed arrow. In examples, any suitable means for sensing one or more electrical currents may be used.

In examples the current sensor 15 is operationally coupled to the apparatus 28 and any number or combination of intervening elements can exist between them (including no intervening elements).

In other examples the current sensor may be operationally coupled to the one or more of the other elements of the wireless energy transfer apparatus 2.

The one or more batteries 42 are configured to store energy and provide energy/power to one or more of the elements of the wireless energy transfer apparatus 2.

As used herein, battery is intended to mean any apparatus or means suitable for storing energy and providing energy/power to the elements of the wireless energy transfer apparatus 2. In examples, any suitable battery may be used. For example, the one or more batteries may be lithium ion, lithium polymer and/or a nickel metal hydride battery.

The one or more batteries 42 may directly or indirectly provide power to the controller 30 of the apparatus 28 and/or the one or more transceivers 44 and/or the one or more magnetic field generators 8.

For example, the one or more batteries 42 may be configured to provide power to the one or more magnetic field generators 8 to allow an alternating electrical current to pass through the one or more magnetic field generators 8 to generate one or more magnetic fields. The apparatus 28 may control the flow of power to the one or more magnetic field generator(s) 8 to, for example, pass an alternating electrical current through the magnetic field generator(s) 8.

In some examples, the one or more batteries 42 may be configured to receive energy to charge the one or more batteries 42. The energy may be received via, for example, the one or more magnetic field generators 8 and/or via a wired connection to the wireless energy transfer apparatus 2.

In examples, the one or more batteries 42 provide means for providing energy/power.

The one or more transceivers 44 may comprise one or more transceivers for sending and/or receiving signals comprising information. For example, the one or more transceivers 44 may comprise one or more radio transceivers 44. In examples, the one or more radio transceivers 44 are configured to transmit and receive radio frequency signals. For example, the one or more radio frequency transceivers 44 may be compatible with one or more short range radio protocols, such as Bluetooth or Wi-Fi protocols. Alternatively or additionally, the one or more radio frequency transceivers 44 may be compatible with one or more longer range radio protocols, such as one or more cellular telephone protocols.

The one or more transceivers 44 may be configured to transmit and/or receive signals comprising information to provide information to and/or receive information from a further apparatus such as a further wireless energy transmission apparatus 4 and/or a further apparatus 18 separate from the wireless energy transfer apparatuses 2, 4.

For example, the one or more transceivers 44 may be configured to transmit and/or receive one or more schedule signals 16 and/or one or more synchronization signals 20 (see, for example, FIGS. 5 and 6).

In examples, the one or more transceivers 44 provide means for transmitting and/or receiving signals comprising information. In examples any suitable means for transmitting and/or receiving signals comprising information may be used.

The one or more magnetic field generators 8 are configured to generate one or more magnetic fields to wirelessly transfer energy from the wireless energy transfer apparatus 2.

Any suitable magnetic field generator(s) or means for generating magnetic field(s) may be used. For example, the one or more magnetic field generators 8 may comprise one or more coils and/or one or more windings and/or one or more turns of a suitable conducting material. In examples, one or more copper coils, for example, may be used.

In examples, the apparatus 28 controls the magnetic field generator(s) 8 to produce one or more magnetic fields. In some examples, the apparatus 28 uses power from the one or more batteries 42 to cause an alternating electrical current to pass through the magnetic field generator(s) 8 to provide the magnetic field.

In the example of FIG. 2 the magnetic field generator 8 may be used to wirelessly transmit energy to at least one load 6 (see, for example, FIGS. 5 and 6). In other examples any suitable mechanism and/or method and/or apparatus and/or device may be used to wirelessly transmit energy from the wireless energy transfer apparatus 2 to at least one load 6.

For example, in some examples a wireless energy transfer signal generator may be used to generate wireless energy transfer signals to transfer energy wirelessly from the wireless energy transfer apparatus 2 to at least one load 6.

In the example of FIG. 2, the wireless energy transfer signal generator comprises a magnetic field generator(s) 8 and the wireless energy transfer signals comprise magnetic flux 26 (See FIGS. 5 and 6).

In some examples, the one or more magnetic field generators 8 may also be considered one or more receivers as the one or more magnetic field generators 8 may be configured to receive energy from one or more magnetic fields generated by, for example, a further wireless energy transfer apparatus 4.

In examples, the received energy is used to charge the one or more batteries 42.

To prevent discharged wireless energy transfer apparatuses 2 from becoming loads on a system (see FIGS. 5 and 6) by starting to charge a different frequency may be used for transmitting power from the wireless energy transfer apparatus 2 compared to receiving power at the wireless energy transfer apparatus 2.

For example, the frequency used for charging may automatically prevent power transmission and the frequency used for power transmission automatically prevents charging.

In some examples the one or more magnetic field generators 8 may be configured to correspond to a receiver and/or transmitter device to which and/or from which energy is to be wirelessly transmitted or received. For example, a coil of the magnetic field generator(s) 8 may physically correspond in size, and/or shape, and/or number of turns with a coil to which energy is to be transferred or received from.

In examples, the one or more magnetic field generators 8 may be configured to allow energy to be wirelessly transferred from or received at the wireless energy transfer apparatus 2 with the wireless energy transfer apparatus in any orientation (see, for example, FIGS. 7A and 7B).

Additionally or alternatively the one or more magnetic field generators 8 may be configured to allow the wireless energy transfer apparatus 2 to be charged at the same time as at least one further wireless energy transfer apparatus 2. See, for example, FIGS. 7A and 7B.

In some examples the one or more wireless energy transfer signal generators, such as the magnetic field generators 8 in the example of FIG. 2, may be configured to receive wireless energy transfer signals, such as magnetic flux 26, that have been modulated in some way to transfer information. For example, a magnetic field may be used as a carrier wave to modulate information that is received by the one or more magnetic field generators 8 and processed by the apparatus 28 to extract the information.

As illustrated in the example of FIG. 2, the wireless energy transfer apparatus 2 may comprise a current sensor 15. Any suitable current sensor 15 may be used.

In examples, the current sensor 15 is configured to measure the amount and/or direction of electrical current flow in a conductor of the wireless energy transfer apparatus 2. As illustrated in the example of FIG. 2, the current detector may be positioned to measure the amount and/or direction of current flow in a conductor adjacent the one or more magnetic field generators 8.

In some examples, the conductor may comprise a power line close to the magnetic field generator(s) 8.

In examples, the apparatus 28 may be configured to receive at least one current signal 14, from the current sensor 15, comprising information to allow determination of an electrical current flowing through the conductor of the wireless energy transfer apparatus 2.

The apparatus 28 may use the received information in the at least one current signal 40 to determine the amount and/or direction of current flow in the conductor of the wireless energy transfer apparatus 2.

In examples, the apparatus 28 may be configured to control adjustment of a frequency and/or phase of wireless energy transfer at the wireless energy transfer apparatus 2 in dependence upon the determination of the amount and/or direction of current flow in the conductor.

For example, the apparatus 28 may be configured to control adjustment of a frequency and/or a phase of a magnetic field generated by the magnetic field generator(s) 8 by, for example, controlling the frequency and/or phase of an alternating electrical current passing through the magnetic field generator(s) 8.

See, for example, FIG. 4A.

In some examples, one or more of the elements of the wireless energy transfer apparatus 2 illustrated in the example of FIG. 2 may be considered wireless power transmitter electronics.

In examples, one or more of the elements of the wireless energy transfer apparatus 2 may be embedded within a ferromagnetic core (see, for example, FIGS. 7A and 7B). For example, the one or more batteries 42 and apparatus 28 may be embedded within a ferromagnetic core and may be shielded from wireless energy transfer signals such as magnetic flux 26.

In examples, the magnetic field generator(s) 8 may be wound around the ferromagnetic core to permit use of the wireless energy transfer apparatus 2 in any orientation and stacking of the wireless energy transfer apparatus 2 with similar wireless energy transfer apparatuses 4 to form a common ferromagnetic core. See, for example, FIG. 7A.

In some examples, the wireless energy transfer apparatus 2 may comprise any number of additional elements. In some examples, the wireless energy transfer apparatus 2 may not comprise one or more elements illustrated in the example of FIG. 2. For example, the wireless energy transfer apparatus 2 may, in some examples, not comprise the one or more transceivers 44 and/or the current sensor 15.

FIG. 3 illustrates an example of a method 300. The method 300 may be performed by the apparatus 28 of FIG. 1 and/or the apparatus 2 of FIG. 2.

At block 302 a wireless energy transfer apparatus 2 is controlled to synchronize energy transfer with at least one further wireless energy transfer apparatus 4 to wirelessly transfer energy to at least one load 6 in combination with the at least one further wireless energy transfer apparatus 4.

In examples, the wireless energy transfer apparatus 2 and at least one further wireless energy transfer apparatus 4 are inductive energy transfer apparatus. See, for example, FIG. 2.

In some examples, the at least one load 6 may be a single load that receives energy wirelessly from a plurality of wireless energy transfer apparatuses 2, 4.

In examples, controlling a wireless energy transfer apparatus 2 to synchronize energy transfer with at least one further wireless energy transfer apparatus 4 comprises controlling a frequency and/or phase of an electrical current passing through at least one magnetic field generator 8 to generate at least one magnetic field having substantially the same frequency and phase as a magnetic field generated by the at least one further wireless energy transfer apparatus 4.

In some examples, controlling a wireless energy transfer apparatus 2 to synchronize energy transfer with at least one further wireless energy transfer apparatus 4 comprises receiving one or more signals. In examples, the received one or more signals comprise information and the one or more signals may be processed to extract the information to allow for wireless energy transfer to be synchronized with the at least one further wireless energy transfer apparatus 4.

In some examples, the received signals provide feedback to the wireless energy transfer apparatus 2 to cause the wireless energy transfer apparatus 2 to synchronize energy transfer with the at least one further wireless energy transfer apparatus 4. For example, the received signals may comprise magnetic flux 26 from the at least one further wireless energy transfer apparatus 4 to provide inductive feedback to the apparatus 28 to cause the wireless energy transfer apparatus 2 to synchronize energy transfer with at least one further wireless energy transfer apparatus 4.

Additionally or alternatively controlling a wireless energy transfer apparatus 2 to synchronize energy transfer with at least one further wireless energy transfer apparatus 4 may comprise transmitting one or more signals to cause the at least one further wireless energy transfer apparatus 4 to synchronize energy transfer with the wireless energy transfer apparatus 2. The transmitted one or more signals may comprise information and/or provide feedback to the at least one further wireless energy transfer apparatus 4.

Examples in which synchronization is brought about automatically using inductive feedback may be considered passive synchronization and examples where a controller 30 actively controls the wireless energy transfer to bring about synchronization may be considered active synchronization.

In some examples, the methods illustrated in FIGS. 4A to 4D, and described in the following description, may be considered to form at least part of block 302 of FIG. 3.

FIG. 4A illustrates an example of a method 400. The method 400 may be performed by the apparatus 28 of FIG. 1 and/or the apparatus 2 of FIG. 2.

At block 402 at least one schedule signal 16 is received. For example, the at least one schedule signal 16 may be received at the apparatus 28 via the one or more transceivers 44 and/or the one or more magnetic field generators 8.

The at least one schedule signal 16 may originate from at least one further wireless energy transfer apparatus 4 or from an apparatus 18 separate from the wireless energy transfer apparatuses 2, 4. See, for example, FIGS. 5 and 6.

In examples, the received at least one schedule signal 16 comprises information to allow determination of a schedule to be used (see block 408).

At block 404 at least one current signal is received. For example, at least one current signal 14 may be received at the apparatus 28 from the current sensor 15.

In examples, the at least one current signal 14 comprises information to allow determination of an electrical current flowing through a conductor of a wireless energy transfer apparatus 2.

The received at least one current signal 14 may be processed and the information extracted.

At block 406 amount and/or direction of current flow in a conductor of a wireless energy transfer apparatus 2 is determined.

In examples, the information received in the at least one current signal 14 may be used in determining the amount and/or direction of current flow in the conductor.

At block 408 adjustment of frequency and/or phase of wireless energy transfer at the wireless energy transfer apparatus 2 is controlled in dependence upon the determination of the amount and/or direction of current flow in the conductor.

For example, the frequency and/or phase of a magnetic field generated by the one or more magnetic field generators 8 may be adjusted upon the determination of the amount and/or direction of current flow in the conductor.

In examples, controlling adjustment of the frequency and/or phase of wireless energy transfer at the wireless energy transfer apparatus 2 comprises controlling adjustment of the frequency and/or phase of wireless energy transfer to increase wireless energy out-flow from the wireless energy transfer apparatus 2.

For example, the amount and/or direction of current flow in the conductor may indicate that the energy outflow from the wireless energy transfer apparatus 2 is suboptimal and the frequency and/or phase of wireless energy transfer may be adjusted to increase the wireless energy outflow from a wireless energy transfer apparatus 2.

As a further example, at block 406 it may be determined that current flow in the conductor of the wireless energy transfer apparatus 2 is in a direction opposite to that expected for wireless energy transfer from the wireless energy transfer apparatus 2. This may indicate that the wireless energy transfer apparatus 2 is receiving energy wirelessly and therefore acting as a load 6 on the system of wireless energy transfer apparatuses rather than contributing energy to the impended load 6.

In examples, each of the wireless energy transfer apparatuses of the plurality of wireless energy transfer apparatus may perform the method 400 and, for example, attempt to adjust frequency and/or phase of wireless energy transfer concurrently which may lead to a chaotic process.

In examples, determining the amount and/or direction of current flow in the conductor and controlling adjustment of the frequency and/or phase of wireless energy transfer at the wireless energy transfer apparatus 2 is repeated according to a schedule. This is indicated by the arrow returning from block 408 to block 404 in FIG. 4A.

In examples, information in the received at least one schedule signal 16 may be used to determine the schedule to be used to allow for the plurality of wireless energy transfer apparatuses to synchronize energy transfer. In examples this is to avoid the plurality of wireless energy transfer apparatuses attempting to adjust frequency and/or phase at the same time to avoid a chaotic process and/or to allow the plurality of wireless energy transfer apparatuses to synchronize quickly and efficiently.

In some examples, one or more blocks illustrated in FIG. 4A may be omitted. Additionally or alternatively the method 400 illustrated in FIG. 4A may comprise one or more additional actions.

FIG. 4B illustrates an example of a method 500. The method 500 may be performed by the apparatus 28 of FIG. 1 and/or the apparatus 2 of FIG. 2.

At block 502 at least one synchronization signal 20 is received from at least one further apparatus. In examples, the at least one synchronization signal 20 comprises information to allow energy transfer from the wireless energy transfer apparatus 2 to be synchronized with wireless energy transfer from the at least one further wireless energy transfer apparatus 4.

For example, the at least one synchronization signal 20 may comprise information to allow the frequency and/or phase of a magnetic field generated by the magnetic field generator(s) 8 of FIG. 2 to be synchronized with the frequency and/or phase of a magnetic field generated by the at least one further wireless energy transfer apparatus 4.

At block 504 transmission of at least one synchronized signal to at least one further apparatus is caused. In examples, the at least one synchronization signal 20 comprises information to allow energy transfer from the wireless energy transfer apparatus 2 to be synchronized with energy transfer from the at least one further wireless energy transfer apparatus 4.

The transmitted synchronization signal(s) may be as described in relation to the received synchronization signal(s) of block 502.

In examples, the at least one further apparatus of block 502 and/or the at least one further apparatus of block 504 is the at least one further wireless energy transfer apparatus 4. In other examples, the at least one further apparatus of block 502 and/or the at least one further apparatus of block 504 is an apparatus 18 separate from the wireless energy transfer apparatuses 2, 4.

At block 506 a wireless energy transfer apparatus 2 is controlled to synchronize energy transfer with at least one further wireless energy transfer apparatus 4. For example, a wireless energy transfer apparatus 2 may be controlled in dependence upon the information received in the synchronization signal(s) 20 in block 502.

In examples block 506 may be as described in relation to block 302 of FIG. 3.

In examples, the at least one synchronization signal 20 comprises a message, the message comprising timing information of wireless energy transfer and/or phase correction information.

For example, one of the plurality of wireless energy transfer apparatuses transferring energy to the load 6 (see, for example, FIGS. 5 and 6) may be designated the master. This may, for example, be the wireless energy transfer apparatus 2, 4 which is the first wireless energy transfer apparatus 2, 4 to begin transferring energy to the load 6. However, any suitable method for determining a master of the system may be used.

The master wireless energy transfer apparatus 2, 4 may transmit its clock information in the at least one synchronization signal 20 to allow the other wireless energy transfer apparatuses to synchronize with the master wireless energy transfer apparatus 2, 4.

Additionally or alternatively the master wireless energy transfer apparatus 2, 4 may transmit phase correction information to the other wireless energy transfer apparatuses to allow the other wireless energy transfer apparatuses to synchronize wireless energy transfer with the master wireless energy transfer apparatus 2, 4.

In other examples, an apparatus 18 separate from the wireless energy transfer apparatuses 2, 4 may act as a master device having a master clock and may share timing information and/or phase correction information with the plurality of wireless energy transfer apparatus 2, 4 using at least one synchronization signal 20 (see, for example, FIG. 5).

In some examples one or more blocks illustrated in FIG. 4B may be omitted. For example block 502 or 504 may be omitted. Additionally or alternatively the method 500 illustrated in FIG. 4B may comprise one or more additional actions.

FIG. 4C illustrates an example of a method 600. The method 600 may be performed by the apparatus 28 in FIG. 1.

At block 602 inductive feedback from at least one further wireless energy transfer apparatus 4 is received to cause synchronization of wireless energy transfer from the wireless energy transfer apparatus 2 and the at least one further wireless energy transfer apparatus 4 to the at least one load 6.

In examples, the received inductive feedback steers the frequency and/or phase of wireless energy transfer from the wireless energy transfer apparatus 2.

For example, the controller 30 may be configured to receive inductive feedback that "pulls" the wireless energy transfer from the wireless energy transfer apparatus 2 into synchronization with the at least one further wireless energy transfer apparatus 4.

That is, in examples, the magnetic field(s) produced by the at least one further apparatus 4 directly affects the frequency and/or phase of the magnetic field generated at the at least one wireless energy transfer apparatus 2, and the opposite is also true, to cause the plurality of wireless energy transfer apparatuses to be "pulled" automatically into synchronization.

For example, an input into an oscillator circuit that controls the alternating electrical current passing through a magnetic field generator 8 may be directly affected by the inductive feedback.

An example of a controller 30 that is configured to receive inductive feedback is a blocking oscillator 52 (see, for example, FIGS. 6 and 8).

FIG. 4D illustrates an example of a method 700. The method 700 may be performed by the apparatus 28 in FIG. 1 and/or the apparatus 2 in FIG. 2.

At block 702 a wireless energy transfer apparatus 2 is controlled to stop wireless transfer of energy.

In examples, this may be achieved using any suitable method. For example, the apparatus 28 may control the apparatus 2 to stop wireless transfer of energy by cutting power from the battery 42 to the magnetic field generator(s) 8.

At block 704 one or more wireless energy transfer signals from at least one further wireless energy transfer apparatus 4 are received. For example, the one or more wireless energy transfer signals may comprise magnetic flux from the at least one further wireless energy transfer apparatus 4.

At block 706 frequency and/or phase information of the wireless energy transfer signals from the at least one further wireless energy transfer apparatus 4 is determined. For example, frequency and/or phase information of a magnetic field generated by the at least one further wireless energy transfer apparatus 4 may be determined by processing the received one or more wireless energy transfer signals to extract the information.

At block 708 the wireless energy transfer apparatus 2 is controlled to synchronize energy transfer with the at least one further wireless energy transfer apparatus 4. That is, the wireless energy transfer apparatus 2 is controlled to wirelessly transfer energy in synchronization with the at least one further wireless energy transfer apparatus 4 based on the determined frequency and/or phase information.

In examples, block 708 may be as described above in relation to block 302 of FIG. 3.

Controlling the wireless energy transfer apparatus 2 to wirelessly transfer energy in synchronization with the at least one further wireless energy transfer apparatus 4 may comprise causing impulse steering of a resonator of the wireless energy transfer apparatus 2.

In some examples, a sampled reference phase lock loop circuit may be used to lock the wireless energy transfer signals from the wireless energy transfer apparatus 2 to the phase/frequency information determined from the received wireless energy transfer signals.

In examples, method 700 may be repeated periodically. This is indicated in the example of FIG. 4D by the arrow returning from block 708 to block 702. This can be done, for example, to ensure that the wireless energy transfer apparatus 2 remains in synchronization with the at least one further wireless energy transfer apparatus 4.

In some examples one or more blocks illustrated in FIG. 4D may be omitted. Additionally or alternatively the method 700 illustrated in FIG. 4D may comprise one or more additional actions.

In examples, the apparatus 28 of FIG. 1 and/or the apparatus 2 of FIG. 2 may be configured to perform the method of one or more of FIGS. 3, 4A, 4B, 4C and/or 4D.

FIG. 5 illustrates an example of a system 54.

In the example of FIG. 5, the system 54 comprises a wireless energy transfer apparatus 2, at least one further wireless energy transfer apparatus 4, a load 6 and a further apparatus 18 separate from the wireless energy transfer apparatuses 2, 4. In examples any suitable number of wireless energy transfer apparatuses may be included in the system 54.

In the example of FIG. 5, the wireless energy transfer apparatuses 2, 4 are inductive energy transfer apparatuses.

The wireless energy transfer apparatus 2 is generating a magnetic field and providing magnetic flux 26 to the load 6 which is extracting energy from the magnetic flux 26 provided by the wireless energy transfer apparatus 2. In this way, energy is being wirelessly transferred from the wireless energy transfer apparatus 2 to the load 6.

In the example of FIG. 5 at least one further wireless energy apparatus 4 is transferring energy to the load 6 in the same way.

That is, in the example of FIG. 5 the wireless energy transfer signals 24 are the magnetic flux signals 26.

In the example of FIG. 5, energy transfer from the wireless energy transfer apparatus 2 and the at least one further wireless energy transfer apparatus 4 is synchronized such that energy from the two apparatuses is provided in combination to the load 6.

In FIG. 5, the wireless energy transfer apparatuses 2, 4 are in communication as indicated by the double-ended arrow linking the two apparatuses 2, 4. For example, the wireless energy transfer apparatus 2 may be transmitting/receiving signals to/from the at least one further wireless energy transfer apparatus 4 using the one or more transceivers 44 (see FIG. 2).

In the illustrated example, at least one schedule signal 6 may be transferred between the wireless energy transfer apparatus 2 and the at least one further wireless energy transfer apparatus 4 and may be used as described in relation to FIG. 4A.

Additionally or alternatively in the example of FIG. 5 at least one synchronization signal 20 may be transmitted between the wireless energy transfer apparatuses and used as described in relation to FIG. 4B.

In some examples, the further apparatus 18 may act as a master or server apparatus and provide schedule signal(s) 16 and/or synchronization signal(s) 20 to the plurality of wireless energy transfer apparatuses 2, 4.

This is indicated by the double-headed arrows linking the further apparatus 18 with the wireless energy transfer apparatuses 2, 4.

In examples, the wireless energy transfer apparatuses do not communicate with each other if a master or server apparatus 18 is present. In some examples, the wireless energy transfer apparatuses do communicate with each other if a master or server apparatus 18 is present.

In some examples the further apparatus 18 may not be present in the system 54.

In examples, the at least one further wireless energy transfer apparatus 4 may be considered the wireless energy transfer apparatus and the wireless energy transfer apparatus 2 may be considered the at least one further wireless energy transfer apparatus 4 (see, for example, FIG. 6).

FIG. 6 illustrates an example of a system 54.

The system 54 illustrated in the example of FIG. 6 is similar to the system 54 illustrated in the example of FIG. 5. However, in the example of FIG. 6 the wireless energy transfer apparatus 2 and the at least one further wireless energy transfer apparatus 4 have been swapped.

In the example of FIG. 6 the wireless energy transfer signals 24, which are in the illustrated example magnetic flux 26, from the wireless energy transfer apparatuses are providing inductive feedback 22 to each other.

That is, the magnetic flux 26 from the wireless energy transfer apparatus 2 is providing inductive feedback 22 to the at least one further wireless energy transfer apparatus and the magnetic flux 26 from the at least one further wireless energy transfer apparatus 4 is providing inductive feedback 22 to the wireless energy transfer apparatus 2.

In the example of FIG. 6 the inductive feedback 22 received by the wireless energy transfer apparatus 2 and the at least one further wireless energy transfer apparatus 4 causes the wireless energy transfer apparatuses 2, 4 to synchronize wireless energy transfer to the load 6.

This may be as described above in relation to FIG. 4C.

It is noted that in the example of FIG. 5 the wireless energy transfer signals 24 may also be received at the corresponding wireless energy transfer apparatuses but in the example of FIG. 5 do not provide inductive feedback.

In the example of FIG. 6, the further apparatus 18 is also receiving the wireless energy transfer signals 24, which in the illustrated example is magnetic flux 26, from the wireless energy transfer apparatuses 2, 4.

In some examples, the further apparatus 18 may determine phase/frequency information from the received wireless energy transfer signals 24 and transmit one or more synchronization signals 20 to the wireless energy transfer apparatuses 2, 4. The one or more synchronization signals 20 may be provided in addition to the inductive feedback 22 at the wireless energy transfer apparatuses 2, 4 or instead of the inductive feedback 22 at the wireless energy transfer apparatuses 2, 4.

The further apparatus 18 may not be present in the system 54 of FIG. 6.

In examples, a method is provided, the method comprising using a plurality of wireless energy transfer apparatuses to wirelessly transfer energy to a single load.

For example, FIGS. 5 and 6 illustrate examples of a method of using a plurality of wireless energy transfer apparatuses 2, 4 to wirelessly transfer energy to a single load 6. The plurality of wireless energy transfer apparatuses 2, 4 may be used to transfer energy to the single load 6 in combination and/or concurrently and/or at the same time and/or contemporaneously.

In the examples of FIGS. 5 and 6 the wireless energy transfer apparatuses 2, 4 are inductive wireless energy transfer apparatuses.

Each of the plurality of wireless energy transfer apparatuses 2, 4 may form part of a magnetic energy transmission path to the single load 6. The magnetic energy transmission path may be a common magnetic energy transmission path.

In examples, the plurality of wireless energy transfer apparatuses 2, 4 may be stacked. See, for example, FIG. 7A.

FIG. 7A illustrates examples of wireless energy transfer apparatuses 2, 4.

In the left side of FIG. 7A a wireless energy transfer apparatus 2 is stacked on top of a further wireless energy transfer apparatus 4. The wireless energy transfer apparatuses 2, 4 may be as the apparatus 2 of FIG. 2.

In the example of FIG. 2, the stacked wireless energy transfer apparatuses 2, 4 comprise a ferromagnetic core 46 inside which the one or more batteries 42 and the apparatus 28 are located.

In the example, the ferromagnetic core 46 comprises an upper planar surface 56, a lower planar surface 58 and one or more sides 60 connecting the two. The upper and lower planar surfaces 56, 58 may be substantially parallel to each other.

In examples, the ferromagnetic core 46 may have any suitable shape. For example the ferromagnetic core 46 may be a cuboid or a disc as in the example of FIG. 7A.

In the example of FIG. 7A the magnetic field generator 8 of the wireless energy transfer apparatus 2 is a coil 8 that is wound around the ferromagnetic core 46. The coil comprises multiple turns of conductive wire wound around the one or more sides 60 and in the example is wound around the circumference of the ferromagnetic disc 46.

The coil 8 may be operationally connected to the apparatus 28 through holes in the ferromagnetic core 46. The holes may be just big enough to allow the material of the coil 8 to pass through.

Accordingly, in examples the one or more batteries 42 and the apparatus 28 are magnetically shielded by the ferromagnetic core 46 and only the coil 8 and the ferromagnetic core 46 are configured to receive magnetic flux from external magnetic fields and are therefore magnetically 'visible'.

In examples the coil 8 may have any suitable number of turns and may, in some examples, have only one turn. The coil 8 may have a number of turns that corresponds with a receiver coil of a load 6 for example.

In examples any suitable number of coils 8 may be used. For example, two coils may be used (see FIG. 8).

The coil 8 (or coils) may have any number of turns extending in the x and or y direction indicated in the example of FIG. 7A.

As an example, the coil 8 may comprise only turns in the y direction forming a vertical coil extending up the one or more sides 60 of the wireless energy transfer apparatus 2.

In another example, the coil 8 may comprise only turns in the x direction forming a planar coil around the ferromagnetic core 46.

In the example of FIG. 7A the coil 8 has turns in the x direction and the y direction forming a 'donut' shape.

As the planar surfaces 56, 58 are unobstructed the wireless energy transfer apparatuses 2, 4 may be stacked to create a longer ferromagnetic core with each wireless energy transfer apparatus 2, 4 adding its coil to the stack.

In examples the coil 8 is unobstructed or open in the positive y direction and also in the negative y direction. Put another way, the coil 8 of the wireless energy transfer apparatus 2 is open or unobstructed to the top and bottom of the wireless energy transfer apparatus 2.

That is, in examples there may be no ferromagnetic material, such as a ferromagnetic plate, between the coil and the exterior of the wireless energy transfer apparatus 2 in the positive and negative y directions, or top and bottom of the apparatus 2.

In the example of FIG. 7A, the magnetic flux 26 from the wireless energy transfer apparatus 2 is open or unobstructed in every direction away from the ferromagnetic core 46.

Therefore, in examples the wireless energy transfer apparatus 2 can be used in any orientation. This provides, for example, ease of use of the wireless energy transfer apparatus 2 as, for example, it cannot be positioned the wrong way around thus preventing energy transfer.

For example, the wireless energy transfer apparatus 2 may be configured to wirelessly transfer energy to at least one load 6 in any orientation.

In examples, the wireless energy transfer apparatus 2 may be considered operationally symmetrical about a horizontal plane having a constant value on the y axis passing through the center of the wireless energy transfer apparatus 2.

In examples, the wireless energy transfer apparatus 2 may be considered symmetrical within manufacturing and/or operational tolerances about the same plane.

In examples, the magnetic flux 26 from the wireless energy transfer apparatuses 2, 4 in the stack can penetrate the coils 8 of the other wireless energy transfer apparatuses 2, 4 in the stack and the apparatuses share, at least partly, a magnetic flux path.

In examples the wireless energy transfer apparatuses 2, 4 can operate in synchronization, each adding its part of power and energy to the inductive energy transmission, due to the common magnetic flux path providing inductive feedback to the wireless energy transfer apparatuses 2, 4.

In other examples, any of the methods described herein may be used to provide for synchronized wireless energy transfer from the wireless energy transfer apparatuses 2, 4 in the stack. For example see FIGS. 3, 4A, 4B, 4C and 4D.

In examples the at least one load 6 may also form part of the stack. The load 6 may be located at any position in the stack and may be positioned between two wireless energy transfer apparatuses 2.

In examples, a single wireless energy transfer apparatus, such as a charger, may be used to charge the wireless energy transfer apparatuses 2, 4 in the stack at the same time.

For example, the magnetic field from a charger, such as a charger plate, can penetrate the coils 8 of all of the wireless energy transfer apparatuses 2, 4 to wirelessly transfer energy to all of the apparatuses 2, 4 at the same time.

In examples a wireless energy transfer apparatus 2 may act as an additional path for a magnetic field to reach at least one further wireless energy transfer apparatus 4. For example, when a wireless energy transfer apparatus 2 and at least one further wireless energy transfer apparatus 4 are located to an energy transfer system, such as a charger, the at least one wireless energy transfer apparatus 2 may act as an additional path for a magnetic field from the energy transfer system to reach the at least one further wireless energy transfer apparatus 4.

In the example of FIG. 7A, if a charger were located underneath the stack of wireless energy transfer apparatuses the at least one further wireless energy transfer apparatus 4 may act as an additional path to allow a magnetic field from the charger to reach the wireless energy transfer apparatus 2. In this way a wireless energy transfer apparatus 2, 4 may be configured to provide for wireless charging of multiple wireless energy transfer apparatuses 2, 4 from a single energy source at the same time.

The right side of FIG. 7A illustrates a further example of a wireless energy transfer apparatus 2. The lower right example in FIG. 7A illustrates a perspective view and the upper right example in FIG. 7A illustrates an exploded perspective view.

The wireless energy transfer apparatus 2 in the upper and lower right examples in FIG. 7A are as those illustrated in the stack on the left of the figure and may be as described above.

The wireless energy transfer apparatus 2 in the upper and lower right examples in FIG. 7A comprises a cover 48. The cover may be made from any suitable non ferrous material, for example any suitable plastic.

FIG. 7B illustrates and example of a wireless energy transfer apparatus 2.

The wireless energy transfer apparatus 2 of FIG. 7B is as the wireless energy transfer apparatus in the upper and lower right examples of FIG. 7A.

The wireless energy transfer apparatus 2 in the example of FIG. 7B comprises an additional ferromagnetic layer 50 covering the coil(s) 8. In the illustrated example, the additional ferromagnetic layer 50 extends around the coil(s) covering the coil(s) along the x direction and extends across the extent of the coil(s) in the y direction (see axis in FIG. 7A).

In examples, the additional ferromagnetic layer 50 covers the coil(s) from the side but leaves the coil(s) open or unobstructed to the top and bottom or positive and negative y directions.

The additional ferromagnetic layer 50 provides an improved magnetic return route for the wireless power transfer from or to the wireless energy transfer apparatus 2.

In examples, the wireless energy transfer apparatuses 2, 4 illustrated in FIGS. 7A and/or 7B may comprise any number of additional.

FIG. 8 illustrates an example of a controller 30. In the example of FIG. 8 the controller 30 is a blocking oscillator 52.

The blocking oscillator 52 is operationally connected to power at V, for example from the one or more batteries 42, and comprises a transformer T, a resistor R a capacitor C and a transistor Q. The transformer T comprises inductors La and Lb.

The blocking oscillator 52 is configured to operate in a conventional manner.

In examples the inductors La, Lb of the blocking oscillator form the magnetic field generators 8 of the wireless energy transfer apparatus 2. For example, the inductors La, Lb may be coils 8 around a ferromagnetic core 46 as illustrated in FIGS. 7A and 7B.

In examples, the inductor Lb may receive magnetic flux from inductor La to allow operation of the blocking oscillator 52 and the inductors La, Lb may receive magnetic flux 26 from at least one further wireless energy transfer apparatus 4 to provide inductive feedback 22 to the blocking oscillator 52.

Accordingly, in examples inductive feedback 22 may directly steer the frequency and/or phase of the wireless energy transfer.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although examples of the present disclosure have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    controlling a wireless energy transfer apparatus to synchronize wireless energy transfer to at least one load with wireless energy transfer from at least one further wireless energy transfer apparatus to wirelessly transfer energy to the at least one load in combination with the at least one further wireless energy transfer apparatus, the wireless energy transfer apparatus being stackable with the at least one further wireless energy transfer apparatus, the wireless energy transfer apparatus and the at least one further wireless energy transfer apparatus each comprising a ferromagnetic core at least partly surrounded by at least one magnetic field generator,
    wherein, when the wireless energy transfer apparatus is stacked with the at least one further wireless energy transfer apparatus, a common magnetic energy transmissions path for inductive energy transfer is created via at least the ferromagnetic cores and corresponding at least one magnetic field generators, and
    wherein controlling the wireless energy transfer apparatus to synchronize energy transfer to at least one load with energy transfer from the at least one further wireless energy transfer apparatus comprises controlling at least one of a frequency or phase of electrical current passing through the at least one magnetic field generator of the wireless energy transfer apparatus to generate at least one magnetic field having substantially the same frequency and phase as a magnetic field generated by the at least one further wireless energy transfer apparatus;
    determining an amount of current flow in a conductor traveling at least through the at least one magnetic field generator of the wireless energy transfer apparatus and controlling adjustment of at least one of frequency or phase of wireless energy transfer at the wireless energy transfer apparatus according to a schedule; and
    receiving at least one schedule signal comprising information to allow determination of the schedule to be used.

2. The method as claimed in claim 1, further comprising: controlling adjustment of the at least one of the frequency or the phase of wireless energy transfer at the wireless energy transfer apparatus in dependence upon the determination of the amount of current flow in the conductor.

3. The method as claimed in claim 2, further comprising: receiving at least one current signal comprising information to allow determination of an electrical current flowing through a conductor of the wireless energy transfer apparatus, wherein determining an amount of current flow in the conductor comprises using the received information in the at least one current signal.

4. The method as claimed in claim 1, further comprising: receiving at least one synchronization signal from at least one further apparatus, the at least one synchronization signal comprising information to allow energy transfer from the wireless energy transfer apparatus to be synchronized with wireless energy transfer from the at least one further wireless energy transfer apparatus.

5. The method as claimed in claim 1, further comprising: receiving inductive feedback from the at least one further wireless energy transfer apparatus to cause synchronization of wireless energy transfer from the wireless energy transfer apparatus and the at least one further wireless energy transfer apparatus to the at least one load.

6. The method as claimed in claim 5, wherein the received inductive feedback steers the at least one of the frequency or the phase of wireless energy transfer from the wireless energy transfer apparatus.

7. The method as claimed in claim 1, further comprising: controlling the wireless energy transfer apparatus to stop wireless transfer of energy;

receiving one or more wireless energy transfer signals from the at least one further wireless energy transfer apparatus;

determining at least one of frequency or phase information of the wireless energy transfer signals from the at least one further wireless energy transfer apparatus; and controlling the wireless energy transfer apparatus to wirelessly transfer energy in synchronization with the at least one further wireless energy transfer apparatus based on the determined at least one of the frequency or the phase information.

8. The method as claimed in claim 1, further comprising:

determining direction of current flow in a conductor of the wireless energy transfer apparatus; and controlling adjustment of the at least one of the frequency or the phase of wireless energy transfer at the wireless energy transfer apparatus in dependence upon the determination of the direction of current flow in the conductor.

9. A wireless energy transfer apparatus comprising:

at least one processor; and at least one memory including computer program code, the at least one memory and the computer program code configured, with the at least one processor, to cause the wireless energy transfer apparatus to perform:

controlling the wireless energy transfer apparatus to synchronize wireless energy transfer to at least one load with wireless energy transfer from at least one further wireless energy transfer apparatus to wirelessly transfer energy to the at least one load in combination with the at least one further wireless energy transfer apparatus, the wireless energy transfer apparatus being stackable with the at least one further wireless energy transfer apparatus, the wireless energy transfer apparatus and the at least one further wireless energy transfer apparatus each comprising a ferromagnetic core at least partly surrounded by at least one magnetic field generator, wherein, when the wireless energy transfer apparatus is stacked with the at least one further wireless energy transfer apparatus , a common magnetic energy transmissions path for inductive energy transfer is created via at least the ferromagnetic cores and corresponding at least one magnetic field generators, and wherein controlling a wireless energy transfer apparatus to synchronize energy transfer to at least one load with energy transfer from at least one further wireless energy transfer apparatus comprises controlling at least one of a frequency or a phase of electrical current passing through the at least one magnetic field generator of the wireless energy transfer apparatus to generate at least one magnetic field having substantially the same frequency and phase as a magnetic field generated by the at least one further wireless energy transfer apparatus;

determining an amount of current flow in a conductor traveling at least through the at least one magnetic field generator of the wireless energy transfer apparatus and controlling adjustment of at least one of frequency or phase of wireless energy transfer at the wireless energy transfer apparatus according to a schedule; and receiving at least one schedule signal comprising information to allow determination of the schedule to be used.

10. The apparatus as claimed in claim 9, wherein the at least one memory and the computer program code are further configured, with the at least one processor, to cause the wireless energy transfer apparatus to perform:

controlling adjustment of the at least one of the frequency or the phase of wireless energy transfer at the wireless energy transfer apparatus in dependence upon the determination of the amount of current flow in the conductor.

11. The apparatus as claimed in claim 10, wherein the at least one memory and the computer program code are further configured, with the at least one processor, to cause the wireless energy transfer apparatus to perform:

receiving at least one current signal comprising information to allow determination of an electrical current flowing through a conductor of the wireless energy transfer apparatus, wherein determining an amount of current flow in the conductor comprises using the received information in the at least one current signal.

12. The apparatus as claimed in claim 9, wherein the at least one memory and the computer program code are further configured, with the at least one processor, to cause the wireless energy transfer apparatus to perform:

receiving at least one synchronization signal from at least one further apparatus, the at least one synchronization signal comprising information to allow energy transfer from the wireless energy transfer apparatus to be synchronized with wireless energy transfer from the at least one further wireless energy transfer apparatus.

13. The apparatus as claimed in claim 9, wherein the at least one memory and the computer program code are further configured, with the at least one processor, to cause the wireless energy transfer apparatus to perform:

receiving inductive feedback from the at least one further wireless energy transfer apparatus to cause synchronization of wireless energy transfer from the wireless energy transfer apparatus and the at least one further wireless energy transfer apparatus to the at least one load.

14. The apparatus as claimed in claim 13, wherein the received inductive feedback steers the at least one of the frequency or the phase of wireless energy transfer from the wireless energy transfer apparatus.

15. The apparatus as claimed in claim 9, wherein the at least one memory and the computer program code are further configured, with the at least one processor, to cause the wireless energy transfer apparatus to perform:

controlling the wireless energy transfer apparatus to stop wireless transfer of energy;

receiving one or more wireless energy transfer signals from the at least one further wireless energy transfer apparatus;

determining at least one of frequency or phase information of the wireless energy transfer signals from the at least one further wireless energy transfer apparatus; and controlling the wireless energy transfer apparatus to wirelessly transfer energy in synchronization with the at least one further wireless energy transfer apparatus based on the determined at least one of frequency or phase information.

16. A non-transitory computer-readable medium comprising program instructions stored thereon for performing at least the following:

controlling a wireless energy transfer apparatus to synchronize wireless energy transfer to at least one load with wireless energy transfer from at least one further wireless energy transfer apparatus to wirelessly transfer energy to the at least one load in combination with the at least one further wireless energy transfer apparatus, the wireless energy transfer apparatus being stackable with the at least one further wireless energy transfer apparatus, the wireless energy transfer apparatus and the at least one further wireless energy transfer apparatus each comprising a ferromagnetic core at least partly surrounded by at least one magnetic field generator, wherein, when the wireless energy transfer apparatus is stacked with the at least one further wireless energy transfer apparatus, a common magnetic energy transmissions path for inductive energy transfer is created via at least the ferromagnetic cores and corresponding at least one magnetic field generators, and wherein controlling a wireless energy transfer apparatus to synchronize energy transfer to at least one load with energy transfer from at least one further wireless energy transfer apparatus comprises controlling at least one of a frequency or a phase of electrical current passing through the at least one magnetic field generator of the wireless energy transfer apparatus to generate at least one magnetic field having substantially the same frequency and phase as a magnetic field generated by the at least one further wireless energy transfer apparatus;

determining an amount of current flow in a conductor traveling at least through the at least one magnetic field generator of the wireless energy transfer apparatus and controlling adjustment of at least one of frequency or phase of wireless energy transfer at the wireless energy transfer apparatus according to a schedule; and receiving at least one schedule signal comprising information to allow determination of the schedule to be used.

\* \* \* \* \*